United States Patent
Subbiah et al.

(10) Patent No.: US 6,449,276 B1
(45) Date of Patent: Sep. 10, 2002

(54) METHOD AND APPARATUS FOR EFFICIENT SWITCHING OF PARTIAL MINICELLS IN ATM ADAPTATION LAYER 2

(75) Inventors: Baranitharan Subbiah, Chelmsford; Sudhir Dixit, Norwood, both of MA (US)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/082,031

(22) Filed: May 20, 1998

(51) Int. Cl.[7] .......................... H04L 12/02; H04L 12/66
(52) U.S. Cl. ................ 370/395.6; 370/395.1; 370/395.3; 370/395.64; 370/400; 370/474
(58) Field of Search ................ 370/389, 395, 370/473, 474, 394, 392, 395.1, 397, 399, 395.3, 395.31, 395.6, 400, 905

(56) References Cited

U.S. PATENT DOCUMENTS

| | | | | |
|---|---|---|---|---|
| 5,568,477 A | * | 10/1996 | Galand et al. | 370/60 |
| 5,774,469 A | * | 6/1998 | Wirkestrand | 370/473 |
| 5,802,050 A | * | 9/1998 | Petersen et al. | 370/394 |
| 5,802,051 A | * | 9/1998 | Petersen et al. | 370/395 |
| 5,809,023 A | * | 9/1998 | Petersen et al. | 370/395 |
| 5,822,321 A | * | 10/1998 | Petersen et al. | 370/474 |
| 5,946,309 A | * | 8/1999 | Westberg et al. | 370/395 |
| 5,978,375 A | * | 11/1999 | Petersen et al. | 370/395 |
| 6,005,871 A | * | 12/1999 | Petersen et al. | 370/474 |
| 6,041,054 A | * | 3/2000 | Westberg | 370/389 |
| 6,061,354 A | * | 5/2000 | Morikawa et al. | 370/395 |
| 6,075,798 A | * | 6/2000 | Lyons et al. | 370/474 |
| 6,289,016 B1 | * | 9/2001 | Subbiah et al. | 370/395 |

FOREIGN PATENT DOCUMENTS

WO      WO 9634478      10/1996

OTHER PUBLICATIONS

Hunt, Ray, ATM—protocols and architecture, Computer Communications, Elsevier Science B.V., vol. 19, 1996, pp. 597–611.*

Mauger, R. et al., "ATM Adaptation Layer Switching," XVI World Telecom Congress Proceedings, Sep. 21, 1997, pp. 207–214.

* cited by examiner

Primary Examiner—Hassan Kizou
Assistant Examiner—Joe Logsdon
(74) Attorney, Agent, or Firm—Altera Law Group LLC

(57) ABSTRACT

A method of switching partial minicells in an AAL2 switching network without the need for re-assembly of the partial minicells at intermediate nodes. Identification of each remainder partial minicell (432) is accomplished using an 8-bit channel identifier (450), a double octet identifier (950) or a triple octet identifier (1050) depending on traffic requirements. Each partial minicell is immediately transmitted based upon the identification code attached to each partial minicell.

27 Claims, 9 Drawing Sheets

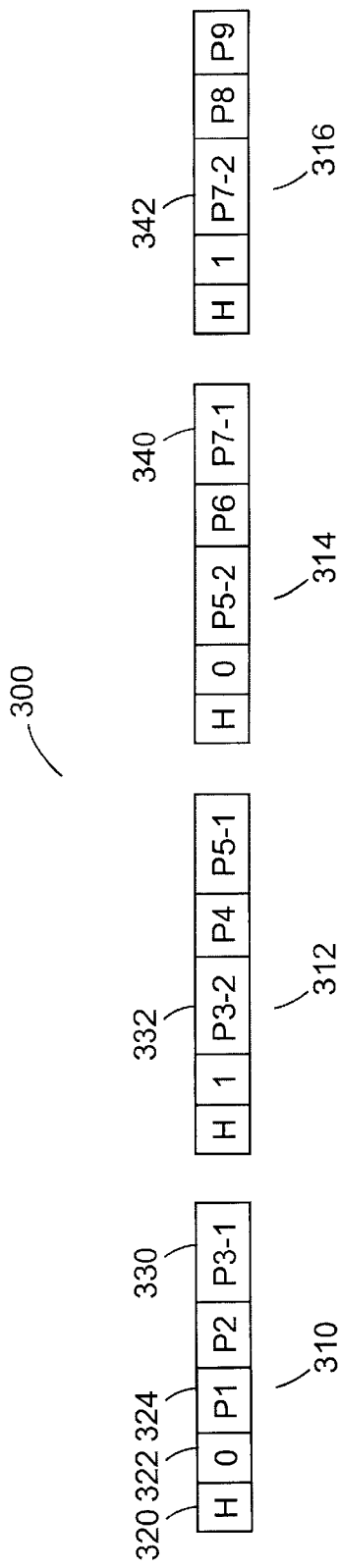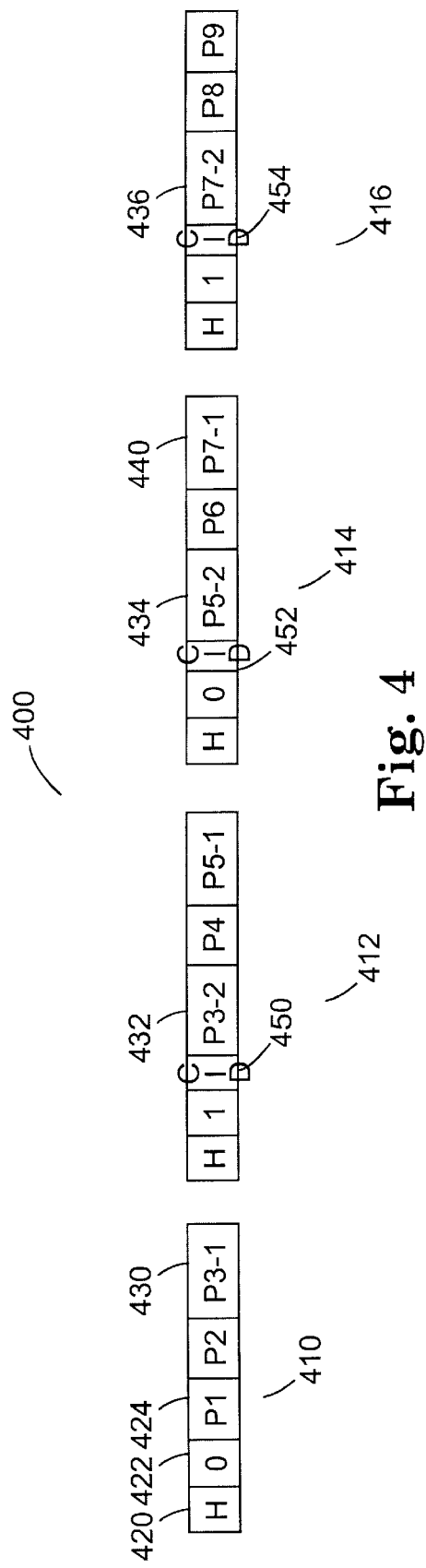
Fig. 3
PRIOR ART
Fig. 4

| I/C VPI | VCI | CID | O/G CID | VPI | VCI | CID STATUS | PACKET SIZE | SIZE RECEIVED | TRUNK/SWITCH | OTHER FIELD |
|---|---|---|---|---|---|---|---|---|---|---|
| 7 | 8 | 1 | 4 | 4 | 5 | IDLE | 0 | 0 | SWITCHING | - |
| 7 | 8 | 2 | 5 | 4 | 5 | ASSIGNED | 36 | 0 | SWITCHING | - |
| 7 | 8 | 3 | 6 | 4 | 5 | ASSIGNED | 36 | 16 | SWITCHING | - |
| 10 | 11 | - | - | 12 | 13 | - | - | - | TRUNKING | - |

Fig. 7

| INCOMING VPI | I/C VCI | I/C CID | OUTGOING CID | O/G VPI | O/G VCI | CID STATUS | OTHER FIELDS |
|---|---|---|---|---|---|---|---|
| 7 | 8 | 1 | 4 | 4 | 5 | IDLE | - |
| 7 | 8 | 2 | 5 | 4 | 5 | ASSIGNED | - |
| 7 | 8 | 3 | 6 | 4 | 5 | IDLE | - |

Fig. 11

METHOD AND APPARATUS FOR EFFICIENT SWITCHING OF PARTIAL MINICELLS IN ATM ADAPTATION LAYER 2

BACKGROUND OF THE INVENTION

1. Field of the Invention.

This invention relates in general to a network communcations, and more particularly to a method and apparatus for efficient switching of partial minicells in ATM Adaptation Layer 2.

2. Description of Related Art.

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT, namely AAL1, AAL2, AAL3/4 and AAL5. In general, the layer services provided by AAL1 are constant bit rate (CBR) services which require information to be transferred between source and destination at a constant bit rate. AAL2 offers a transfer of information with a variable bit rate. In addition, timing information is transferred between source and destination. Since the source is generating a variable bit rate, it is possible that cells are not completely filled and that filling level varies from cell to cell. AAL3/4 is used for transfer of data which is sensitive to loss, but not sensitive to delay. The AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the common part of the convergence sublayer (CPCS).

The AAL2 signaling protocol describes methods by which a switched AAL2 connection can be established between two AAL2 end users across a network that consists of both ATM and AAL2 switches. The current activities in the Study Group 11-WP1/Q6 or ITU-T is focused on specifying the requirements for such a signaling protocol. The important function of AAL2 signaling protocol is to establish an AAL2 connection between two AAL2 end points on a concatenation of ATM Virtual Channel Connections (VCCs) that are either on demand (SVC) or semi-pernanent (PVC). Some the basic requirements of AAL2 signaling protocol include the ability to establish an AAL2 connection between AAL2 end systems that support AESA formats, the ability to support hop-by-hop routing mechanism between AAL2 end systems, the ability to indicate any failures to corresponding management entity, and the ability to setup AAL2 connections with different QoS requirements.

The advantage of AAL2 to carry low bit rate and delay sensitive traffic on point-to-point links such as cellular trunking between base stations (BS or BTS) and mobile switching centers (MSC) has given impetus to AAL2 (minicell) switching. Minicell switching is being looked at seriously by many switch vendors since it offers seamless connectivity between mobile users, and mobile and wireline networks by avoiding intermediate transcoder conversion.

In an AAL2 switching network, peer to peer channel for each user is established through AAL2 signaling, and user packets (minicells) are switched like cells in an ATM network. The channel identifier (CID) mapping table, which, is an extension of the virtual path indicator/virtual channel indicator (VPI/VCI) table, is one of the many approaches that has been discussed for a possible solution to AAL2 switching.

At any given node, incoming CIDs on one VPI/VCI connection are mapped to outgoing CIDs on different VPI/VCI connections based on their destination, which was assigned during AAL2 signaling. The CID table approach is dynamic and efficient in terms of CID re-usability. The table 1100 in FIG. 11 illustrates one example of a CID table. In the table 1100 of FIG. 11, incoming VPIs 1102 are mapped to incoming VCIs 1104, incoming CIDs 1106, outgoing CIDs 1108, outgoing VPIs 1110, outgoing VCIs 1112 and the CID status 1114.

The main goal of AAL2 is to support low bit rate and delay sensitive applications in an ATM environment. AAL2 switching allows the low bit rate applications to share resources across an AAL switching network to improve the efficiency and avoid any protocol conversion. The key idea in minicell switching is that each intermediate node extracts the minicells embedded in an ATM cell and switches them in a different ATM cell belonging to the next hop in the chosen path.

During the cell assembly process, if the size of a minicell is larger than the remaining bytes of a partially filled ATM cell then the minicell is fragmented to fill the available bytes. The remaining portion of that minicell is assembled in the next ATM cell. Upon receiving an ATM cell, a node extracts the minicells embedded in it and if the node finds a partial minicell, it waits for the next ATM cell that contains the remaining part to arrive from the same source. The node performs a re-assembly on these two parts to recreate the complete minicell. The re-assembled minicell undergoes the AAL2 cell assembly in a new ATM cell that will be switched to the next hop.

The main drawback of this conventional approach is that each intermediate node along a selected path has to wait for the arrival of a complete minicell before switching any part of it to the next hop. The waiting time for a complete minicell to arrive at each intermediate node before switching introduces additional delay for delay sensitive traffic. In general, the end-to-end delay has an upper bound which is the sum of Timer-CU values, queuing delays at the previous nodes, reassembly delays (if PMS is not used), and propagation delays.

It is easy to see that the delay is proportional to the number of nodes in the selected path from source to the destination. The size of a data packet is much larger than the size of a voice packet requiring the intermediate node to have a large buffer to store all the information until the last byte is received from the source. Furthermore, each intermediate node is required to have the capability to perform re-assembly of the partial minicells, which is not done in current ATM networks.

It can be seen that there is a need for a more efficient scheme for switching minicells in an ATM AAL2 switching network.

It can also be seen that there is a need for a method and apparatus that allows partial cells to be switched without waiting for a complete minicell to be reassembled.

SUMMARY OF THE INVENTION

To overcome the limitations in the prior art described above, and to overcome other limitations that will become apparent upon reading and understanding the present specification, the present invention discloses a method for switching partial minicells in an AAL2 switching network without delaying to receive remainder partial minicell.

The present invention solves the above-described problems by providing an identification code directly on a remainder partial minicell to provide a means for routing partial minicells without having to reassemble the partial minicells into complete minicells.

A method in accordance with the principles of the present invention includes the steps of receiving a stream of ATM cells, wherein the ATM cells include complete minicells having an identification code, first partial minicells having an identification code, and remainder partial minicells having an identification code attached directly thereto, and transmitting each minicell immediately based upon the identification code when the minicell is a complete minicell or a first partial minicell and based upon the identification code attached directly to the minicell when the minicell is a remainder partial minicell.

Other embodiments of a system in accordance with the principles of the invention may include alternative or optional additional aspects. One such aspect of the present invention is that the step of transmitting further includes the steps of determining a size for a remaining payload for a current ATM cell, determining a size for the remainder partial minicell and inserting the remainder partial minicell in the current ATM cell when the size for the remaining payload is greater than the size for the remainder partial minicell.

Another aspect of the present invention is that the method further includes the step of determining whether a minicell is a complete minicell, a first partial minicell or a remainder partial minicell.

Another aspect of the present invention is that the step of determining further includes the step of comparing the identification code with entries in a identification code table.

Another aspect of the present invention is that a channel identifier table is provided that includes an incoming VPI field, an incoming VCI field, a incoming channel identifier code field; an outgoing channel identifier code field, an outgoing VPI field, an outgoing VCI field, a channel identifier code status field, a packet size field and a size received field.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a stream of cells having minicells that straddle the ATM cell boundaries;

FIG. 4 illustrates a stream of ATM cells according to the present invention;

FIG. 7 illustrates a modified CID mapping table according to the present invention;

FIG. 11 illustrates a typical CID mapping table.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a new scheme that avoids the re-assembly of minicells at intermediate nodes in an ATM Adaptation Layer 2 Switching (AALS) network. The invention provides a more efficient scheme for switching minicells in an ATM AAL2 switching network by allowing partial cells to be switched without waiting for a complete minicell to be reassembled. An additional single octet CID to identify the remainder of a minicell that is straddled across successive ATM cells. Thus, re-assembly is avoided thereby resulting in lower delay, lower delay variation, higher bandwidth utilization, lower buffer size, and elimination of minicell misconcatenation.

Figure 1:
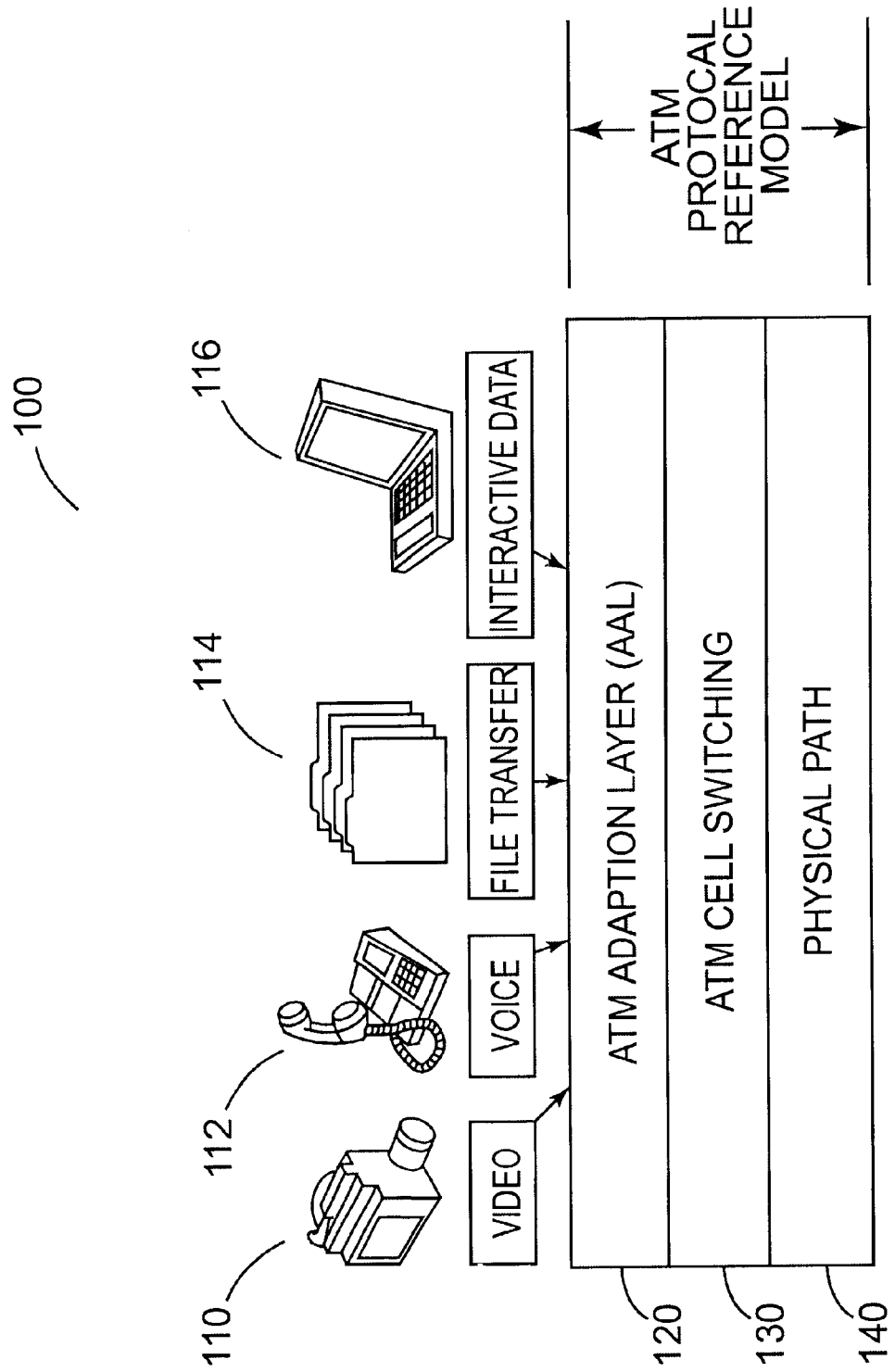
FIG. 1 illustrates the ATM protocol reference model.

FIG. 1 illustrates the ATM protocol reference model 100. Modem networks must handle multiple types of traffic such as video 110, voice 112, data files 114, and interactive data 116. The ATM Adaptation Layer 120 is a collection of standardized protocols that provide services to higher layers by adapting user traffic to a cell format. The AAL 120 is divided into the Convergence Sublayer (CS) and the Segmentation and Reassembly (SAR) sublayer (not shown). The ATM Layer 130 is the second layer of the ATM protocol stack model 100 that constructs and processes the ATM cells. The functions of the ATM layer 130 also include Usage Parameter Control (UPC) and support of Quality of Service (QoS) classes. Finally, the physical path 140 is the bottom layer of the ATM protocol reference model 100. The physical layer 140 is subdivided into two sublayers, the Transmission Convergence (TC) and the Physical Medium (PM) (also not shown). The physical layer 140 provides the ATM cells transmitted over the physical interfaces that interconnect ATM devices.

AAL2 is the new ITU-T specification for supporting low bit rate and delay sensitive applications such as mobile telephony in an ATM environment. AAL2 allows many users to share a single ATM connection by effectively packing variable size packets into ATM cells. AAL2 is subdivided into Service Specific Convergence Specific Layer (SSCS) and Common Parts sub-layer (CPS). The CPS layer approved by ITU-T in September 1997, enables variable size packets (0–64 bytes) from different users to be assembled in an ATM cell payload and transmitted on the same ATM Virtual Channel Connection (VCC). In addition, packets are allowed to straddle across an ATM cell boundary to maximize the bandwidth utilization.

Figure 2:
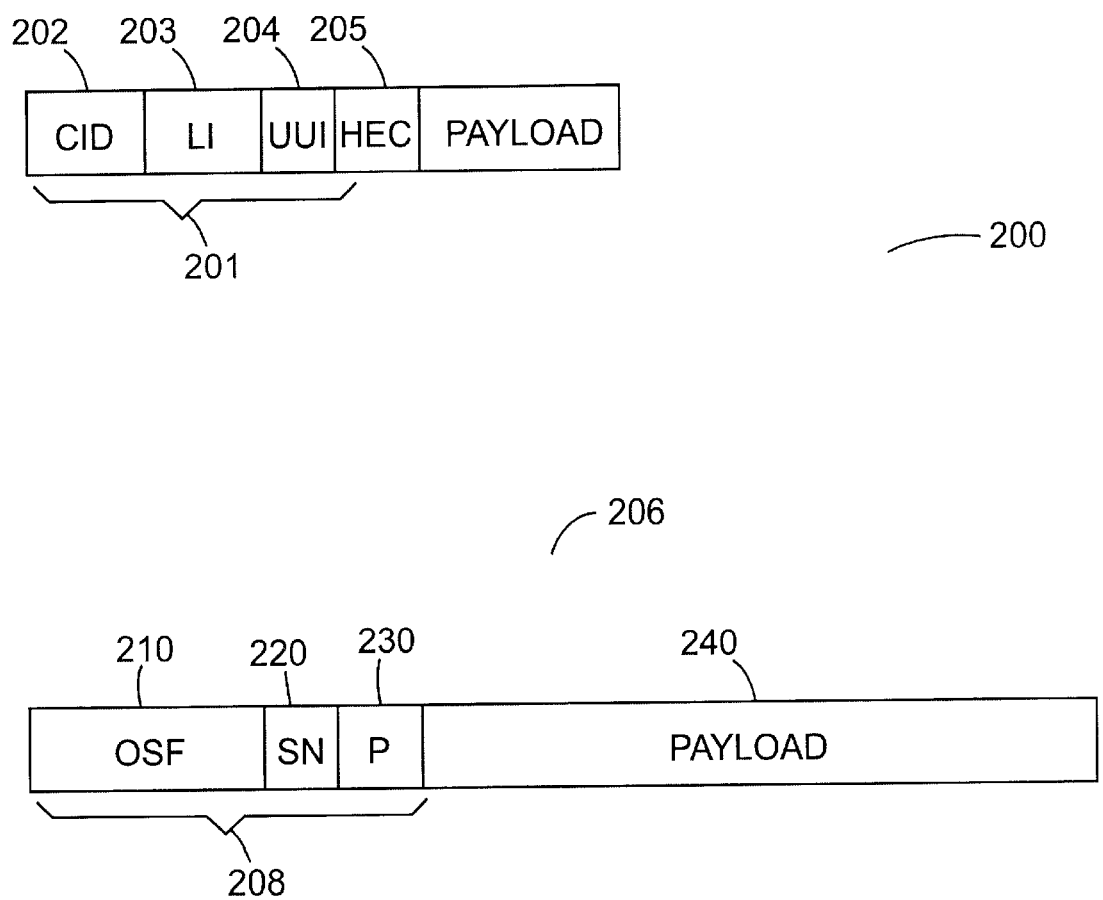
FIG. 2 illustrates the AAL2 packet formats.

FIG. 2 illustrates the AAL2 packet formats 200. In FIG. 2, a CPS-Packet header 201 is 3 bytes long. The CID field 202 is 8 bits long and identifies the LLC for the packet. The LI field 203 includes 6 bits and indicates the length of the LLC packet. When the LI field 203 points beyond the end of the current ATM cell, the packet is split between cells. The five bits of the User-To-User Indication Field 204 are identifying user to user information. The HEC field 205 includes 5 bits and provides error detection over the packet header.

Also shown in FIG. 2 is a typical Common Parts sublayer packet data unit (CPS-PDU) for AAL2 206. The CPS-PDU Start Field (STF) header 208 includes a six bit Offset Field (OSF) 210, a Sequence Number (SN) 220, and a parity bit 230. The STF 202 is one byte in length and occurs at the beginning of every ATM cell payload. As FIG. 2 shows, the Offset Field (OSF) 210 is 6 bits in length. The OSF 210 indicates the remaining length of the packet that (possibly) started in the preceding cell from this ATM connection and is continuing in the current cell. Thus, the OSF 210 points to the start of the first new packet and provides immediate recovery of the packet boundary after an event causing loss of packet delineation. The 1-bit sequence number (SN) field 220 provides a modulo-2 sequence numbering of cells. The one parity (P) bit 230 provides odd parity and covers the STF. Then, the payload 240 includes 47 bytes.

FIG. 3 illustrates a stream of ATM cells 300 wherein minicells in the ATM cells are divided over the boundary of the ATM cells. In FIG. 3, each cell 310, 312, 314, 316 includes an ATM header 320, a CPS-PDU header 322 and at least one CPS-Packet 324 forming the cell payload. Packets P1 through P9 belong to users U1 to U9, respectively.

In FIG. 3, some of the minicells or packets are divided over the ATM cell boundaries. For example, the third packet P3 is divided so that a first partial packet $P3_1$ 330 is in the first ATM cell 310 and the remainder partial packet $P3_2$ 332 is in the second ATM cell 312. Likewise, the seventh packet P7 is divided so that a first partial packet $P7_1$ 340 is in the third ATM cell 314 and the remainder partial packet $P7_2$ 342 is in the fourth ATM cell 316.

In an AAL2 switching (AALS) network, a minicell received from an incoming AAL2 connection is switched to an outgoing AAL2 connection based on a Channel IDentfier (CID) mapping table as discussed earlier. To optimize bandwidth utilization, it is desirable to completely fill the ATM cells with minicells. This may some time result in a minicell straddling across two successive ATM cells, e.g., first partial packet $P3_1$ 330 and the remainder partial packet $P3_2$ 332 as shown in FIG. 3. Therefore, a minicell could arrive in successive ATM cells at the destination.

Since the trailing part of a minicell placed in a subsequent ATM cell does not contain any identification, a node that receives the first part of a minicell has to wait for the remainder part before switching the complete packet to the next node. However, the delay in reassembling a minicell before switching is undesirable since the traffic may be delay sensitive. Furthermore, storing the first partial packet increases the buffer requirement for data traffic.

Herein three embodiments of the present invention for implementing partial minicell switching according to the present invention will be discussed. The three embodiments will be discussed in order of the increasing number of additional octets needed for partial minicell switching implementation. Those skilled in the art will recognize that each embodiment is more suitable for the specific environment identified.

The first embodiment of the present invention uses only a single octet and is applicable in constant rate codec (packet size is constant throughout the session) and low bit rate environment. The overhead (single octet for each partial minicells) is the least in the first embodiment. However, the savings in overhead comes at the expense of complexity in the switching node. The second and third embodiments are more generic and suitable in a variable packet transport environments such as data over AAL2 and VBR codec. All the three embodiments can be implemented in a single node if that node has to service different traffic requirements. This requires some additional signaling messages during the connection establishment.

1. Single Octet CID

To enhance the performance of minicell switching in an AAL2 switching network, a single byte CID is used to identify partial minicells straddled across ATM cells. FIG. 4 illustrates a stream of ATM cells according to the present invention 400. In FIG. 4, minicells in the ATM cells are divided over the boundary of the ATM cells. In FIG. 4, each cell 410, 412, 414, 416 includes an ATM header 420, a CPS-PDU header 422 and at least one CPS-Packet 424 forming the cell payload. Packets P1 through P9 belong to users U1 to U9, respectively.

In FIG. 4, some of the minicells or packets are divided over the ATM cell boundaries. For example, the third packet P3 is divided so that a first partial packet $P3_1$ 430 is in the first ATM cell 410 and the remainder partial packet $P3_2$ 432 is in the second ATM cell 412. Likewise, the seventh packet P7 is divided so that a first partial packet $P7_1$ 440 is in the third ATM cell 414 and the remainder partial packet $P7_2$ 436 is in the fourth ATM cell 416. However, a channel identifier 450, 452, 454 is added to the head of each remainder packet 432, 434, 436.

The single byte CIDs 450, 452, 454 allow the intermediate nodes in an AALS network to switch them independently. Since each part of a minicell has a single octet CID for its identification, the intermediate nodes can treat them as individual minicells and assemble them with other minicells that belong to the same next hop.

Figure 5:
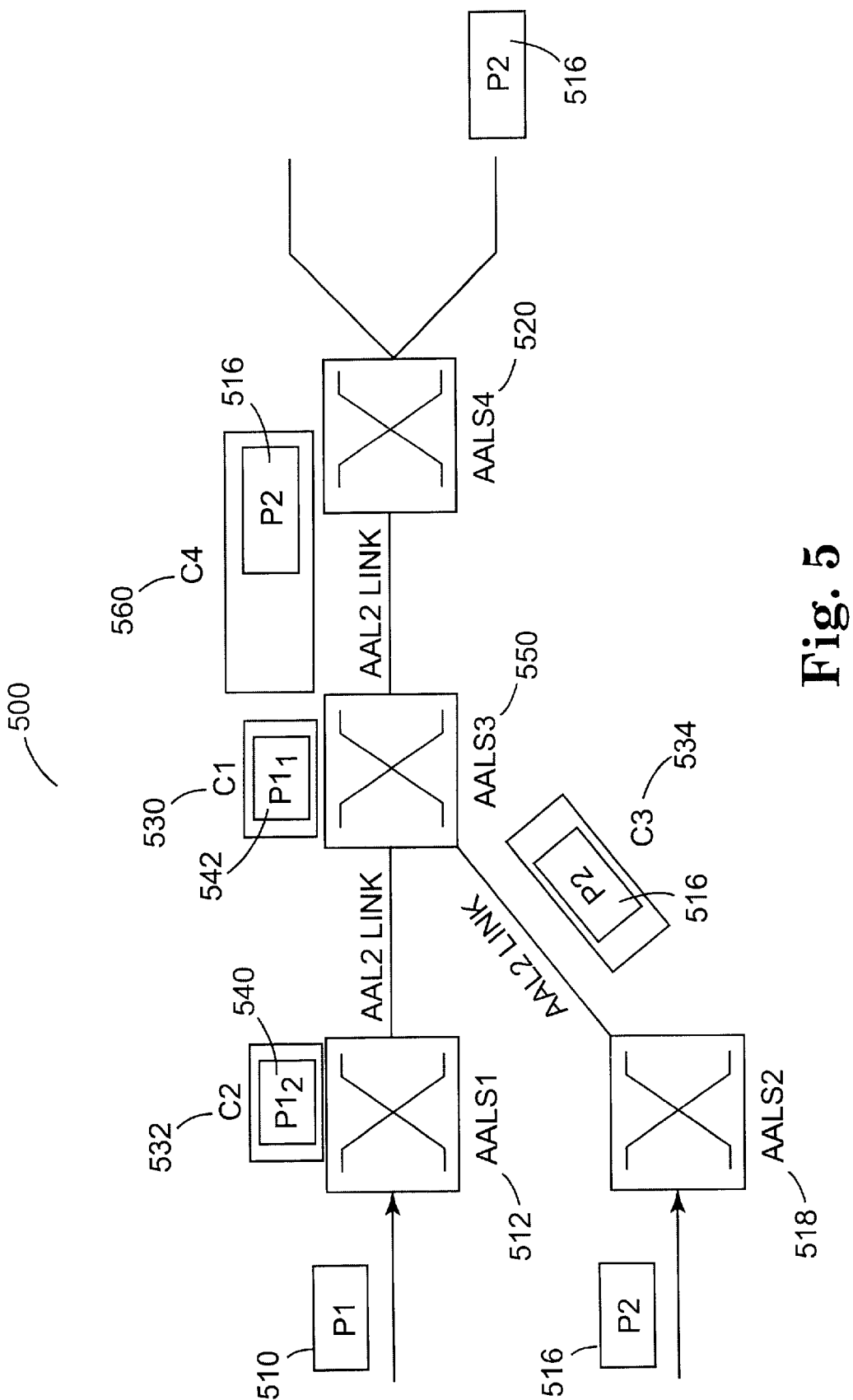
FIG. 5 illustrates the conventional method of minicell switching.

FIG. 5 illustrates the conventional method of minicell switching 500. In FIG. 5, minicell P1 510 arrives at AALS1 512 and minicell P2 516 at AALS2 518 for the same destination, i.e., AALS4 520. Due to AAL2 multiplexing, minicell P1 510 is straddled across two ATM cells C1 530 and C2 532, whereas minicell P2 516 is packed completely in single ATM cell C3 534. For reasons such as Timer-CU value and buffer delay, ATM cell C2 532 containing minicell $P1_2$ 540 is delayed at AALS1 550. ATM cells C1 530 containing minicell $P1_1$ 542 and C3 534 containing minicell P2 516 arrive at AALS3 550 for switching at the same time. In the conventional method, minicell P2 516 is extracted from C3 534 and transmitted immediately in cell C4 560, whereas partial minicell $P1_1$ 542 is stored until the remainder part $P1_2$ is received.

Figure 6:
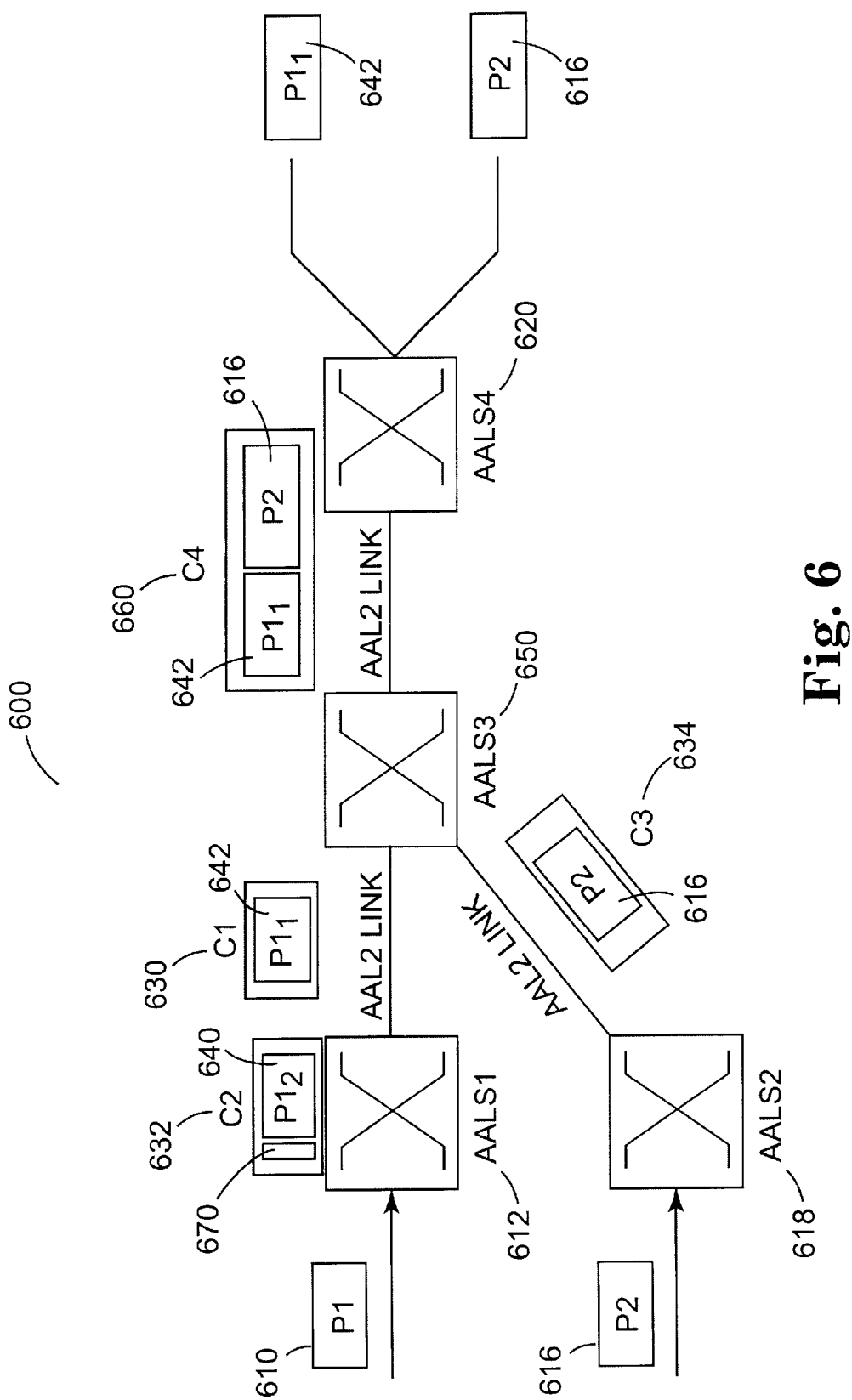
FIG. 6 shows the partial minicell switching scheme with a single octet CID 600 according to the present invention.

FIG. 6 shows the partial minicell switching scheme with a single octet CID 600 according to the present invention. In FIG. 6, the partial minicell switching method according to the present invention provides a single byte CID 670 for partial minicell $P1_2$ 640. Thus, partial minicell $P1_2$ 640 will have a single byte CID 670 for its identification. Minicells $P1_1$ 642 and P2 616 are extracted from cells C1 630 and C3 634, respectively, and assembled in a new ATM cell C4 660 which is transmitted to AALS4 620 immediately. The remainder part of the minicell P1, i.e., $P1_2$ 640 is assembled on a different ATM cell as soon it arrives at AALS3 650 and transmitted separately to AALS4 620. It can be seen from the above description that the partial minicell switching scheme does not require any minicell re-assembly at AALS3 650 and does not introduce any additional delay for the minicells.

The benefits of the partial minicell switching scheme are provided by the added intelligence in the AALS nodes. In addition to the state information in the CID table in each node it also maintains two more variables for each active connection. FIG. 7 illustrates a modified CID mapping table 700 according to the present invention. In the table 700 of FIG. 7, incoming VPIs 702 are mapped to incoming VCIs 704, incoming CIDs 706, outgoing CIDs 708, outgoing VPIs 710, outgoing VCIs 712 and the CID status 714. However, in addition to these parameters, the table 700 in FIG. 7 includes two new variables: packet size 750 and the size received 760. The packet size field 750 is the agreed packet size for the entire session of a particular connection and the size received field 760 indicates whether a node has received any partial minicell on a particular connection.

The second entry 770 in the table 700 shows that the node is waiting for a new minicell 772 and the third entry 774 indicates that the node received a partial minicell having a size of 16 bytes for incoming CIDs 2 780 and 3 782, respectively. Also, the table 700 identifies whether a AAL2 connection is a trunking application 784, i.e., ATM cells containing minicells are switched by ATM layer, or whether the AAL2 is switching 786, i.e., minicell switching. The last entry in the table shows a AAL2 trunking connection 784, in which an ATM cell received on VPI/VCI pair 10/11 790/792 is switched on outgoing VPINVCI pair 12/13 794/796. In this case, there is a one-to-one correspondence between CIDs (ordered set) on incoming and outgoing VCs.

Figure 8:
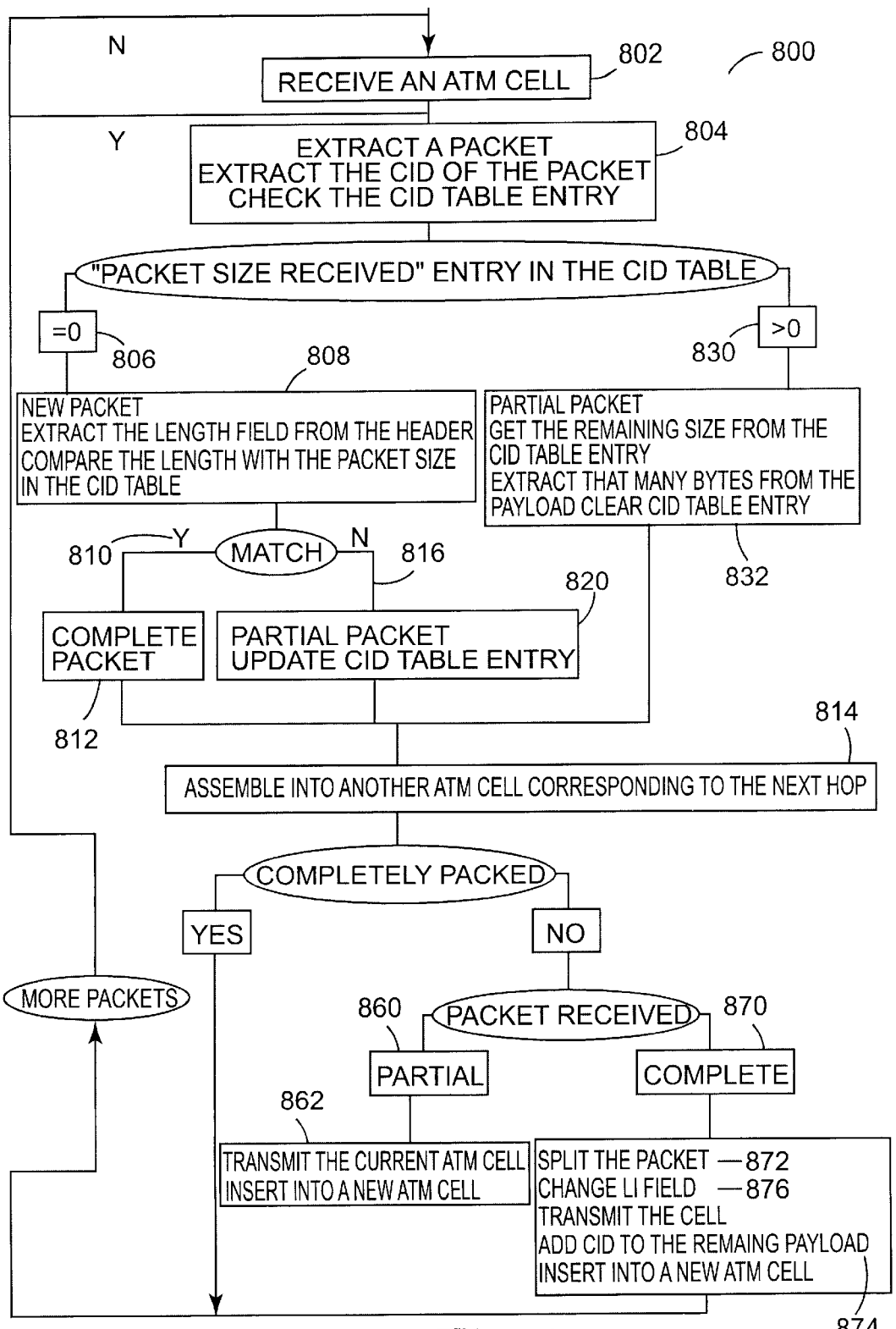
FIG. 8 illustrates a flow chart describing the partial minicell switching scheme.

FIG. 8 illustrates a flow chart describing the partial minicell switching scheme 800. In order to update the packet size entry for a specific connection along the path, the call setup packet has to include an additional single octet to indicate the packet size that will be used for the entire session. A minicell received at an ingress node is converted into CPS-Packet and then assembled with other minicells in an ATM cell destined for the next hop.

Upon receiving an ATM cell 802, an intermediate node extracts the minicells embedded using the CID and the entries found in the CID table 804. If the minicell is new, i.e., the size received field is zero 806, then the length field at the packet header is compared with the packet size field in the CID table entry 808. If there is a match 810, then the minicell is identified as complete 812 and the node assembles it in an ATM cell that belongs to the next hop 814. If the values of packet size field in the CID table and LI field in the CPS-Packet header do not match 816, and the "size received" field is zero 806, then the minicell is identified as a first part of a new minicell, the LI of the partial minicell is extracted and the size received entry of CID table is updated 820.

When an ATM cell that contains the remaining part of the minicell arrives, it can be identified from the CID table entry, i.e., the size received field is non zero 830. The number of bytes that needs to be extracted from the ATM payload is calculated by subtracting the values in the "size received" field from the entry in the "packet size" field and the CID table entries are cleared once a complete minicell is received at any given node 832.

A restriction that is imposed on each node is that a minicell is fragmented into two parts only once from source to the destination. If a node receives a partial minicell 860, then it assembles the partial minicell entirely in a new ATM cell 862. If the remaining payload of the current ATM cell is smaller than the partial minicell then the node can search for a minicell from all incoming AAL2 connections that matches the remaining size or create a new ATM cell for assembling. But, a complete minicell received 870 at any intermediate node has a chance to be fragmented into two parts and packed on different ATM cells 872. If a minicell is straddled across consecutive ATM cells, then a single octet CID is added to the remaining portion of that minicell placed on the second ATM cell 874. At the same time, the length indicator field in the CPS-Packet header is changed to the actual length of the partial minicell placed in the first ATM cell 876.

2. Two Octets: CID and Length Indicator (LI)

Figure 9:
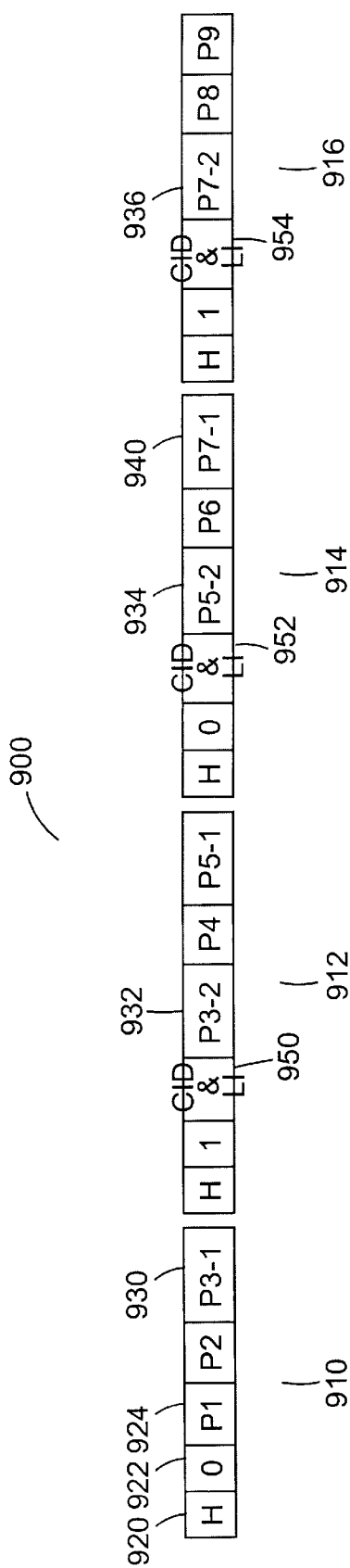
FIG. 9 illustrates an ATM cell stream for the second embodiment of the partial minicell switching scheme according to the present invention, wherein two additional octets (CID and LI) are used for each partial minicell that is fragmented during cell assembly at intermediate nodes.

FIG. 9 illustrates an ATM cell stream for the second embodiment of the partial minicell switching scheme 900 according to the present invention, wherein two additional octets (CID and LI) 950, 952, 954 are used for each partial minicell that is fragmented during cell assembly at intermediate nodes. The use of two octets eliminates the need for a node to maintain state variables and does not impose any requirement on fixing the packet size from users. While carrying variable size minicells, the CID and LI fields 950, 952, 954 appended to the trailing part of a minicell are useful to maintain the minicell delineation inside an ATM cell. The two remaining bits in the LI field can be used for parity check for the additional two octets to protect from any errors.

3. Three Octets of CPS-Packet Header

Figure 10:
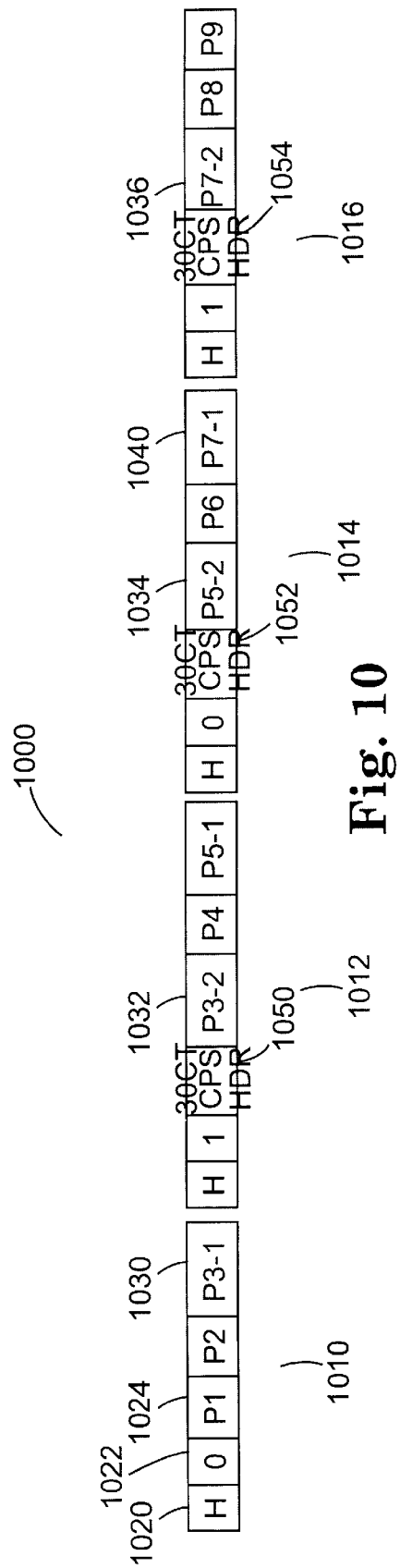
FIG. 10 illustrates the third embodiment, wherein three octet CPS-Packet headers (equivalent to AAL2 specification) are added to the trailing fragment of the minicell.

FIG. 10 illustrates the third embodiment, wherein three octet CPS-Packet headers 1050, 1052, 1054 (equivalent to AAL2 specification) are added to the trailing fragment of the minicell. The headers 1050, 1052, 1054 are the same as in the leading fragment of the minicell except the LI-fields on both fragments are changed to actual size of the respective fragment.

In summary, the partial minicell switching scheme of the present invention eliminates minicell re-assembly at intermediate nodes. Since minicells are switched as soon as they arrive at a node, the delay and delay variation due to minicell switching are reduced. The partial minicell switching scheme according to the present invention improves the bandwidth utilization by allowing partial minicells from different users to share the available resources at intermediate nodes. For data traffic, the partial minicell switching scheme according to the present invention reduces the minicell re-assembly buffer requirement at intermediate nodes. Also, the single byte CID is useful in eliminating the misconcatenation problem in AAL2. Finally, the second and third embodiments do not impose any restriction on the number of times a minicell can be fragmentated from source to the destination. Also, the second and third embodiments inform the destination node about the beginning and end of a minicell through the UUI fields in the CPS-Packet header, so that a variable size minicell can be reassembled correctly.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of switching minicells, comprising the steps of:

receiving a stream of ATM cells, wherein the ATM cells comprise complete minicells having an identification code in a header of the complete minicells to identify the complete minicells, first partial minicells having an identification code in a header of the first partial minicells to identify the first partial minicells, and remainder partial minicells having an identification code attached directly thereto to identify the remainder partial minicells, wherein a length of the identification code attached directly to the remainder partial minicells is dependent upon a traffic requirement of the ATM cells; and transmitting each minicell immediately based upon the identification code in the header of each minicell when the minicell is a complete minicell or a first partial minicell and based upon the identification code attached directly to the minicell when the minicell is a remainder partial minicell.

2. The method of claim 1 wherein the identification code attached directly to the remainder partial minicell is a channel identifier.

3. The method of claim 2 wherein the channel identifier is a one octet code.

4. The method of claim 2 wherein only a single channel identifier is used for each minicell so that the first partial minicell and the remainder partial minicell can not be further fragmented.

5. The method of claim 2 wherein the step of transmitting further comprises the steps of:

determining a remaining available payload space for a current ATM cell;

determining a size for a first remainder partial minicell; and inserting the first remainder partial minicell in the current ATM cell when the size for the remaining available payload space is greater than the size for the first remainder partial minicell.

6. The method of claim 5 further comprising the step of creating a new ATM cell for the remainder partial minicell when the remaining available payload space is less than the size for the remainder partial minicell.

7. The method of claim 5 further comprising the step of searching incoming AAL2 connections for a minicell that is less than or equal to the size for the remaining payload.

8. The method of claim 1 wherein the identification code attached directly to the remainder partial minicell is a channel identifier code and a length indicator field.

9. The method of claim 8 wherein the channel identifier code and a length indicator field comprise two octets.

10. The method of claim 8 wherein the channel identifier code and a length indicator field being two octets in size allow a first partial minicell and a remainder partial minicell to be fragmented again before arriving at a final destination.

11. The method of claim 1 wherein the identification code attached directly to the remainder partial minicell is a CPS-Packet header.

12. The method of claim 11 wherein the CPS-Packet header comprise three octets.

13. The method of claim 11 wherein the CPS-Packet header allow a first partial minicell and a remainder partial minicell to be fragmented again before arriving at a destination node.

14. The method of claim 13 wherein the CPS-Packet header further comprises a user-to-user interface, the user-to-user interface informing a destination node of a beginning and a end of the remainder partial minicell.

15. The method of claim 14 wherein the user-to-user interface provides for a correct reassembly of a variable size minicell.

16. The method of claim 1 further comprising the step of determining whether a minicell is a complete minicell, a first partial minicell or a remainder partial minicell.

17. The method of claim 16 wherein the step of determining further comprises the step of comparing the identification code of a Partial minicell with entries in a identification code table.

18. The method of claim 17 wherein the identification code table is a channel identifier code table.

19. The method of claim 18 wherein the step of comparing further comprises the step of identifying a size received field in the identifier code table in the channel identifier code table.

20. The method of claim 19 wherein the size received field is identified as being zero.

21. The method of claim 20 further comprising the step of comparing a length field in the identification code with a packet size field in the channel identifier code table.

22. The method of claim 21 further comprising the step of identifying a minicell as a complete minicell when the length field in the identification code is the same as the packet size field in the channel identifier code table.

23. The method of claim 22 further comprising the step of identifying a minicell as a first partial minicell when the length field in the identification code is not the same as the packet size field in the channel identifier code table.

24. The method of claim 22 further comprising the steps of extracting a length indicator from the identification code and updating the size received field in the channel identifier code table.

25. The method of claim 19 wherein the size received field is identified as being non-zero.

26. The method of claim 25 wherein the minicell is a remainder partial minicell when the size received field is identified as being non-zero.

27. The method of claim 26 further comprising the steps of:

subtracting a value in the size received field in the channel identifier code table from a entry in the packet size field.

* * * * *